(12) United States Patent
Jin et al.

(10) Patent No.: US 12,408,580 B1
(45) Date of Patent: Sep. 9, 2025

(54) VIBRATORY BACKFILLING DEVICE FOR ON-RIDGE TRANSPLANT

(71) Applicant: LONGMEN LABORATORY, Henan (CN)

(72) Inventors: Xin Jin, Henan (CN); Shaofan Li, Henan (CN); Mingyong Li, Henan (CN); Guoqing Zhao, Henan (CN); Xinwu Du, Henan (CN); Xiaolin Xie, Henan (CN); Yueyun Zhao, Henan (CN); Heng Wang, Henan (CN)

(73) Assignee: Longmen Laboratory, Luoyang (CN)

( * ) Notice: Subject to any disclaimer, the term of this patent is extended or adjusted under 35 U.S.C. 154(b) by 0 days.

(21) Appl. No.: 19/218,466

(22) Filed: May 26, 2025

Related U.S. Application Data

(63) Continuation of application No. PCT/CN2024/125985, filed on Oct. 30, 2024.

(30) Foreign Application Priority Data

Dec. 8, 2023 (CN) .......................... 202311677241.5

(51) Int. Cl.
*A01C 13/00* (2006.01)
*A01B 13/02* (2006.01)
(Continued)

(52) U.S. Cl.
CPC .............. *A01C 13/00* (2013.01); *A01B 13/02* (2013.01); *A01B 39/14* (2013.01); *A01C 5/04* (2013.01); *A01C 11/02* (2013.01)

(58) Field of Classification Search
CPC ........... A01C 11/02; A01C 5/04; A01C 13/00; A01B 11/00; A01B 13/02; A01B 39/10; A01B 39/14
See application file for complete search history.

(56) References Cited

FOREIGN PATENT DOCUMENTS

| CN | 105379456 A | 3/2016 |
|---|---|---|
| CN | 105393659 A | 3/2016 |

(Continued)

OTHER PUBLICATIONS

China National Intellectual Property Administration, First Office Action in Chinese Patent Application No. 202311677241.5 issued on Jan. 15, 2024, which is a foreign application corresponding to this U.S. Patent Application, to which this application claims priority.

(Continued)

*Primary Examiner* — Alicia Torres

(57) ABSTRACT

A vibratory backfilling device includes a mounting frame, vertical base plates, cam link mechanisms and a soil beat actuator. The entire backfilling device is mounted on a rear cross beam of a transplanter, and follows the transplanter to move forwards between ridges; two sides of the mounting frame are connected to the vertical base plates respectively, and the cam link mechanism is mounted on the vertical base plate; and the soil beat actuator is rotatably arranged on the vertical base plate, an upper end of the long plate inclines towards an inner side of the vertical base plate and is hinged to a link rod of the cam link mechanism, and the soil beat actuator is driven by the cam link mechanism and continuously vibrates and beats two sides of the ridge to cause ridge soil to flow back and backfill a hole of the pot seedling.

7 Claims, 5 Drawing Sheets

(51) Int. Cl.
*A01B 39/14* (2006.01)
*A01C 5/04* (2006.01)
*A01C 11/02* (2006.01)

(56) References Cited

FOREIGN PATENT DOCUMENTS

| | | | |
|---|---|---|---|
| CN | 105409366 A | 3/2016 | |
| CN | 207340502 U | 5/2018 | |
| CN | 207369549 U | 5/2018 | |
| CN | 108496477 A | 9/2018 | |
| CN | 208175315 U | 12/2018 | |
| CN | 208242146 U | 12/2018 | |
| CN | 110710347 A | 1/2020 | |
| CN | 111328511 A | 6/2020 | |
| CN | 210641288 U | 6/2020 | |
| CN | 211557892 U | 9/2020 | |
| CN | 112690189 A * | 4/2021 | ............. A01C 13/00 |
| CN | 112913401 A | 6/2021 | |
| CN | 215421528 U | 1/2022 | |
| CN | 216566968 U | 5/2022 | |
| CN | 115152366 A | 10/2022 | |
| CN | 218998747 U | 5/2023 | |
| JP | S6094001 U * | 6/1985 | |
| JP | H09107701 A | 4/1997 | |
| JP | H09275701 A | 10/1997 | |
| JP | H11289816 A | 10/1999 | |
| KR | 20110000350 U | 1/2011 | |
| KR | 200477463 Y1 | 6/2015 | |
| KR | 20160032813 A | 3/2016 | |

OTHER PUBLICATIONS

Notification to Grant Invention Patent Right n Chinese Patent Application No. 202311677241.5 issued on Jan. 18, 2024, which is a foreign application corresponding to this U.S. Patent Application, to which this application claims priority.

International Search Report of the International Searching Authority for State Intellectual Property Office of the People's Republic of China in PCT application No. PCT/CN20Z4/125985 issued on Jan. 13, 2025, which is an international application to which this application claims priority.

* cited by examiner

VIBRATORY BACKFILLING DEVICE FOR ON-RIDGE TRANSPLANT

CROSS-REFERENCE TO RELATED APPLICATION

This application is a continuation application of international application No. PCT/CN2024/125985, filed on Oct. 30, 2024, which claims priority to Chinese Patent Application No. 202311677241.5, filed on Dec. 8, 2023, the disclosures of which are herein incorporated by reference in their entireties.

TECHNICAL FIELD

The present disclosure relates to the field of agricultural planting machinery, and in particular to a vibratory backfilling device for on-ridge transplant.

BACKGROUND

With the continuous development of agricultural mechanization, mechanized transplant has been increasingly applied to agricultural planting in all dimensions. The mechanized transplant greatly relieves the distress of small rural population and agricultural labor shortage, and further improves the planting efficiency and yield of agricultural crops. The on-ridge transplant is an important development direction in recent years.

The on-ridge transplant is to plant pot seedlings on a lifted ridge with a transplanter, and then perform backfilling and compacting. During the backfilling and compacting, existing on-ridge transplanters use backfilling wheels in most cases. The backfilling wheels act on ridges and compacts the ridge soil around the pot seedlings through a gap between the backfilling wheels, and stabilize plants and keep the pot seedlings upright accordingly. In addition, the plants are ensured to grow normally by increasing the contact area between the ridge soil and the pot seedlings. The backfilling wheels work directly on the ridge and are close to the pot seedlings. As a result, the backfilling wheels may crush the pot seedlings when drivers cannot drive linearly all the time in the actual operation process, and the pot seedlings will suffer damage and even death. In addition, excessive backfilling and compacting will lead to excessive compaction of the ridge soil, reduce the porosity of the ridge soil, and affect the air permeability and water permeability of the ridge soil, limiting the normal growth and development of the pot seedlings. In severe cases, water discharge is hindered, resulting in water accumulation and root rot of the pot seedlings.

SUMMARY

To overcome the defects in the prior art, the present disclosure provides a vibratory backfilling device for on-ridge transplant. The device acts on two sides of a ridge, and backfills a hole of a pot seedling based on fluidity of ridge soil, such that damage to the pot seedling can be effectively reduced, a survival rate is increased, an effect of soil backfilling is achieved, excessive compaction is further avoided, and a ridge structure can be further reinforced.

To achieve the above objective, a technical solution used by the present disclosure is as follows:

A vibratory backfilling device for on-ridge transplant includes a mounting frame, vertical base plates, cam link mechanisms and a soil beat actuator, where the mounting frame serves as a machine frame of the entire backfilling device, is mounted on a rear cross beam of a transplanter, and follows the transplanter to move forwards between ridges; two sides of the mounting frame are connected to the vertical base plates respectively, the cam link mechanism is mounted on the vertical base plate, and the cam link mechanism includes a cam, a roller, a slidable push rod, a preload spring, and a link rod; and the soil beat actuator is a long plate, a middle of the long plate is rotatably arranged on the vertical base plate, an upper end of the long plate inclines towards an inner side of the vertical base plate and is hinged to a tail end of the link rod, and the soil beat actuator is driven by the cam link mechanism and continuously vibrates and beats two sides of the ridge where a pot seedling is just planted so as to cause ridge soil to flow back and backfill a hole of the pot seedling.

In some embodiments, the cam link mechanism includes a cam, a roller, a slidable push rod, a preload spring, and a link rod; the cam is located at an uppermost end of the vertical base plate and is connected to an output shaft of a drive motor, a top of the slidable push rod is provided with the roller, and the roller is arranged to press against the cam; and the slidable push rod is capable of moving up and down in the vertical base plate, a lower end of the slidable push rod is hinged to one end of the link rod, the other end of the link rod is hinged to the soil beat actuator, one end of the preload spring is fixedly connected to the vertical base plate, the other end of the preload spring is connected to the slidable push rod, and the preload spring is used for providing upward acting force for the slidable push rod to make the roller at a top end of the slidable push rod press against the cam constantly.

In some embodiments, a straight notch is provided in the vertical base plate, and a shaft for hinging the slidable push rod to the link rod is located in the straight notch.

In some embodiments, a length of the link rod is adjustable.

In some embodiments, the link rod is of nested design, and includes a link rod sleeve and a link rod shaft, the link rod shaft is mounted in the link rod sleeve, a plurality of slots are provided in the link rod sleeve in a lengthwise direction, and the length of the link rod is adjusted by adjusting the link rod shaft to be correspondingly and fixedly connected to the slots at different positions in the link rod sleeve.

In some embodiments, the soil beat actuator is designed in a spade-like shape, a reinforcing rib is arranged in a middle of the soil beat actuator, and two side plates are bent towards the middle at a particular angle.

In some embodiments, the mounting frame is a rectangular frame and is fixed to the rear cross beam of the transplanter through bolts.

In some embodiments, the drive motor is fixed to an outer side of the vertical base plate.

The vibratory backfilling device of the present disclosure has the beneficial effects. For example, the cam link mechanism drives backfilling plates to beat and vibrate two side surfaces of the ridge in a vertical direction and backfill the hole of the pot seedling based on the fluidity of the ridge soil. That is, operation is performed on the two sides of the ridge instead of directly on the ridge, such that crushing of the pot seedling by a backfilling wheel caused by nonlinear traveling of a machine when backfilling operation is performed on the ridge by a traditional method is avoided, the damage of the machine to the pot seedling is reduced, and the survival rate of the pot seedling is increased. Further, while stability of the pot seedling is ensured, hard stratification of the ridge soil caused by the compaction by the backfilling wheel can be avoided, and growth and development of a root system of the pot seedling and infiltration of water are achieved advantageously. Furthermore, by beating and vibrating the two side surfaces of the ridge, while the hole of the pot seedling is backfilled, compactness of the ridge soil at the two side surfaces of the ridge is increased advantageously, and the ridge structure is reinforced and protected to a desired extent.

Figure 1:
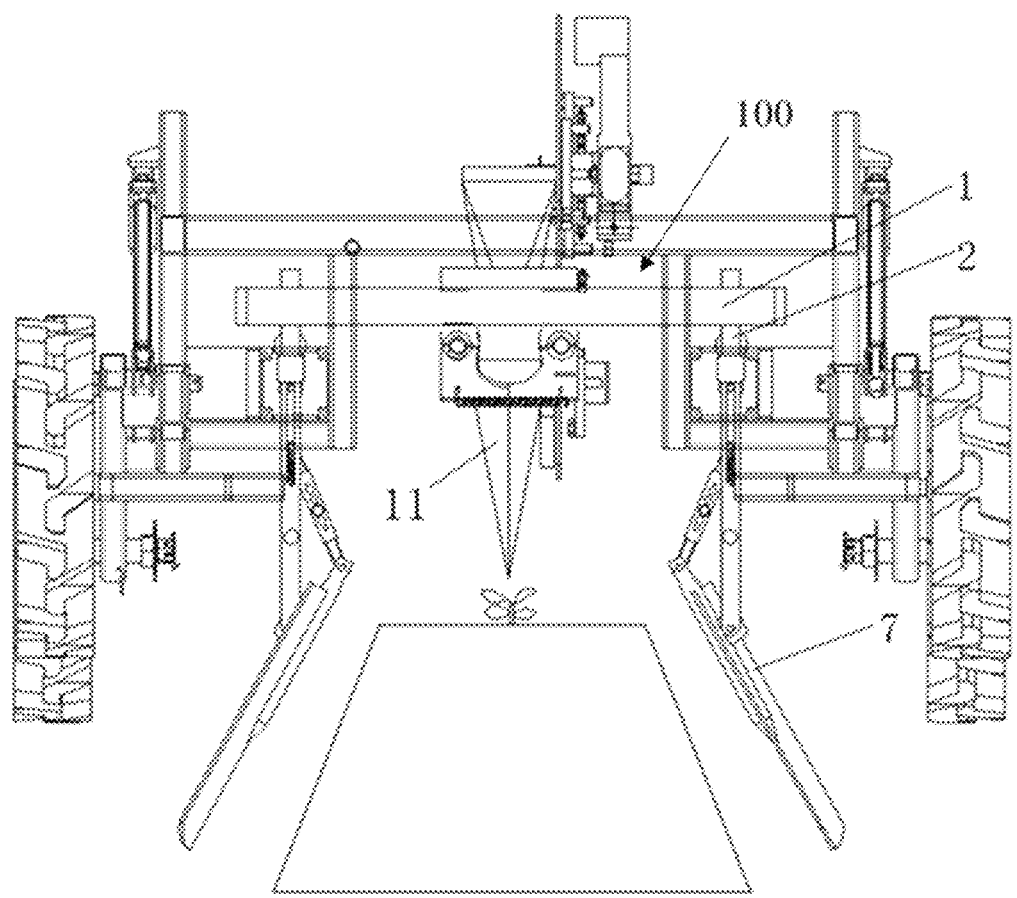
FIG. 1 is a schematic work diagram of a vibratory backfilling device for on-ridge transplant fitted on a transplanter during operation according to embodiments of the present disclosure.

Reference numerals: 1 mounting frame, 2 vertical base plate, 3 cam, 4 roller, 5 slidable push rod, 6 link rod, 7 soil beat actuator, 8 hinge pin, 9 preload spring, 10 drive motor, and 11 duckbill planter.

DETAILED DESCRIPTION

The present disclosure will be described in detail below with reference to accompanying drawings and in conjunction with embodiments.

As shown in FIG. 1, a schematic work diagram of a vibratory backfilling device for on-ridge transplant 100 according to one embodiment of the present disclosure. The vibratory backfilling device 100 is fitted on a transplanter during operation. The backfilling device 100 is fixedly connected to a rear cross beam of the transplanter, with a duckbill planter 11 of the transplanter in front. The transplanter moves forward between ridges, and the duckbill planter 11 digs a hole in a ridge surface during a traveling process and plants a pot seedling into ridge soil. Then, a soil beat actuator of the backfilling device 100 beats two side surfaces of the ridge continuously. Backfilling with the ridge soil is performed advantageously through vibration, such that uprightness and a survival rate of the pot seedling are guaranteed.

Figure 2:
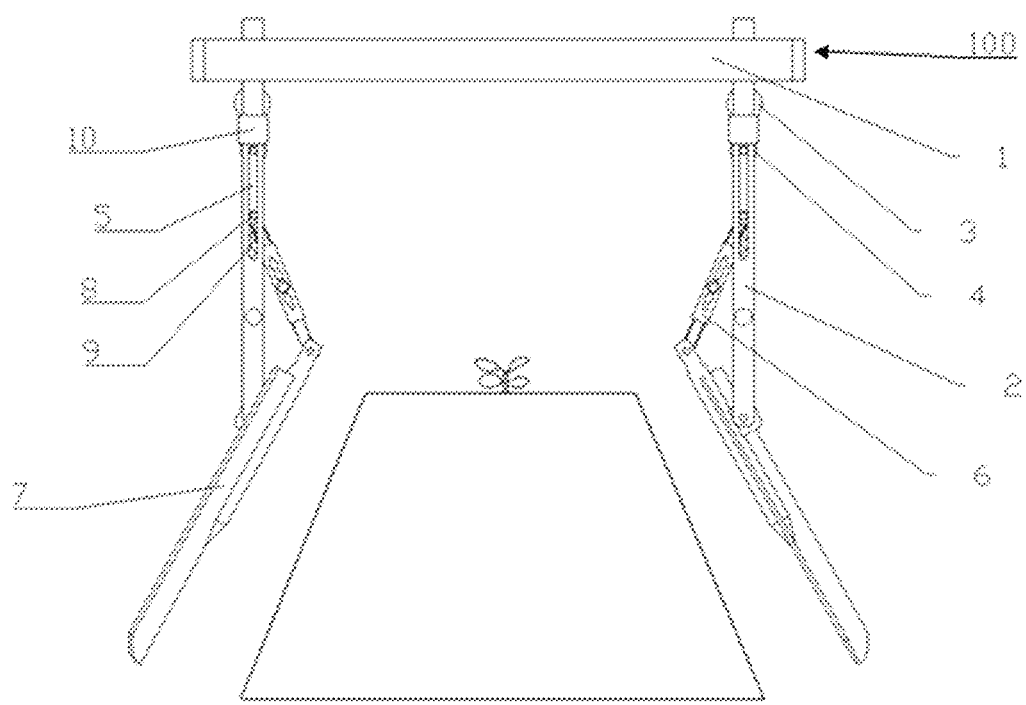
FIG. 2 is a schematic diagram of a vibratory backfilling device for on-ridge transplant according to embodiments of the present disclosure.
Figure 3:
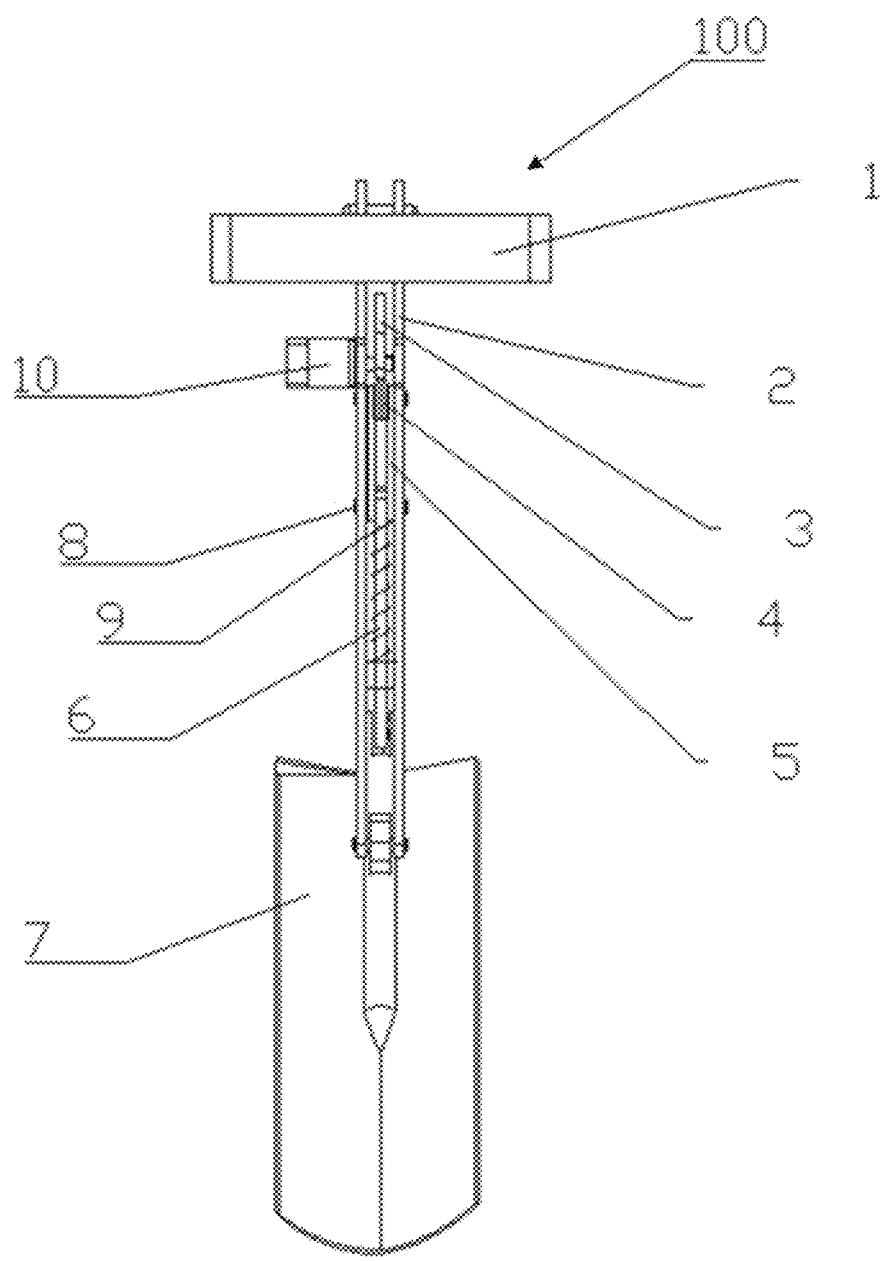
FIG. 3 is a left side view of the vibratory backfilling device for on-ridge transplant according to the present disclosure.
Figure 4:
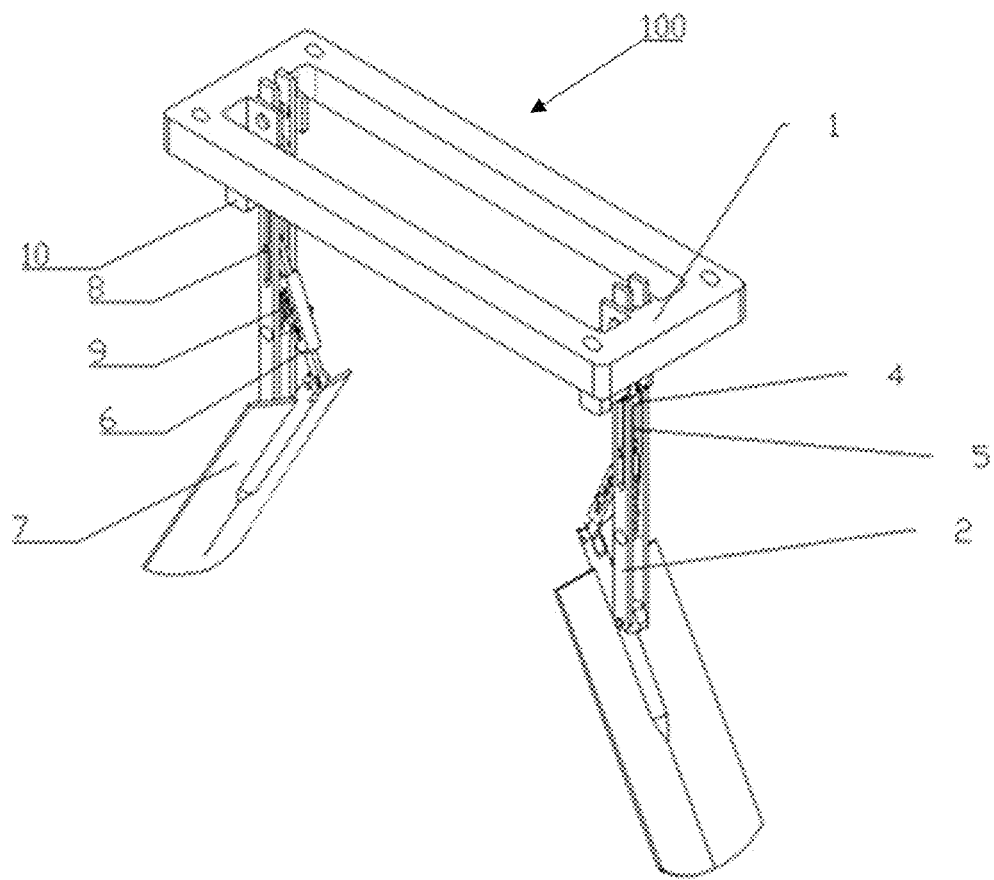
FIG. 4 is an axonometric view of the vibratory backfilling device for on-ridge transplant according to the present disclosure.

FIG. 2 to FIG. 4 are schematic structural diagrams of the vibratory backfilling device 100 the present disclosure. The vibratory backfilling device 100 for on-ridge transplant includes a machine frame, a power drive unit, a power transmission unit, a return unit, and a performing unit.

The machine frame includes a mounting frame 1 and vertical base plates 2. The mounting frame 1 is a rectangular frame configured as a machine frame portion of the entire vibratory backfilling device 100, is mounted on a rear cross beam of the transplanter through bolts, and follows the transplanter to move forward between ridges, so as to ensure stability of a backfilling performing portion during a backfilling process. Two vertical base plates 2 are fixedly arranged at two sides of the mounting frame 1 as another portion of the machine frame of the backfilling device. The power drive unit, the power transmission unit, the return unit, and the performing unit are mounted on the vertical base plate. The vertical base plate 2 and the mounting frame 1 are jointly used as the machine frame to ensure that the backfilling device remains stable in a backfilling operation process.

In some embodiments, the power drive unit is a drive motor 10, and the drive motor 10 is mounted on a side surface of the vertical base plate 2 as a power source of the entire vibratory backfilling device 100, and is used for driving a cam 3 to rotate. In some embodiments, the drive motor 10 is fixed to an outer side of the vertical base plate.

In some embodiments, the power transmission unit is a cam link mechanism including the cam 3, a roller 4, a slidable push rod 5, and a link rod 6. The cam 3, the roller 4 and the slidable push rod 5 constitute a cam roller push rod assembly, and the slidable push rod 5 and the link rod 6 constitute a rocker slider assembly.

The cam 3 is arranged at an uppermost end of the vertical base plate 2 and is connected to an output shaft of the drive motor 10. An upper end of the slidable push rod 5 is provided with the roller 4, and the roller 4 presses against the cam 3 cooperatively. The slidable push rod 5 is slidably arranged in the vertical base plate 2 and is slidably connected to a straight notch in the vertical base plate 2. A lower end of the slidable push rod 5 is hinged to one end of a link rod 6, and the other end of the link rod 6 is hinged to an upper end of the soil beat actuator 7. A middle of the soil beat actuator 7 is hinged to a lower end of the vertical base plate 2, and hinge pins 8 are used at all hinged portions.

In some examples, each of the soil beat actuators 7 is configured in a spade-like shape, a reinforcing rib is arranged in a middle of the soil beat actuator 7, and two side plates are bent towards the middle at a particular angle. The two soil beat actuators 7 at a left side and a right side are symmetrically arranged, and the two soil beat actuators 7 together form a trumpet shape with a smaller top and a larger bottom at two sides of the ridge and adapts to a sectional shape of the ridge. By beating the two sides of the ridge, the ridge soil is vibrated, the ridge soil near a hole of the pot seedling flows back advantageously and backfilling is performed.

The return unit mainly refers to a preload spring 9. In some examples, one end of the preload spring 9 is fixedly connected to the vertical base plate 2 and the other end of the preload spring is connected to the slidable push rod 5. The return spring 9 provides preload force, such that the slidable push rod 5 is forced to tend to move upwards constantly or urged to move upwards, and the roller 4 at the upper end of the slidable push rod 5 is ensured to be in contact with the cam 3 constantly.

In some embodiments, the link rod 6 has a nested configuration, and includes a link rod sleeve and a link rod shaft, the link rod shaft is mounted in the link rod sleeve, a plurality of slots are provided in the link rod sleeve in a length direction, and the length of the link rod 6 is adjusted by adjusting the link rod shaft to correspond to and be fixedly connected to the slots at different positions in the link rod sleeve. Thus, an effect of adapting to a ridge shape is achieved.

In the vibratory backfilling device of the present disclosure, the cam 3 is connected to the drive motor 10, rotates as the drive motor 10 rotates, and simultaneously transmits power to the roller 4 so as to cause the roller 4 and the slidable push rod 5 to move in the vertical direction. The roller 4 is connected to the slidable push rod 5, and the roller 4 rolls along a contour shape of a surface of the cam 3 under the action of the power transmitted by the cam 3. The upper end of the slidable push rod 5 is connected to the roller 4, and the lower end of the slidable push rod is connected to the link rod 6 and the preload spring 9. Under the joint action of the roller 4 and the preload spring 9, the slidable push rod 5 reciprocates in the straight notch of the vertical base plate 2 in the vertical direction. One end of the link rod 6 is hinged to the slidable push rod 5 and the other end of the link rod is hinged to the soil beat actuator 7, and an inclination angle of the soil beat actuator 7 can be adjusted by adjusting the length of the link rod 6. The link rod 6 swings as the slidable push rod 5 moves, and transmits power to the soil beat actuator 7. The soil beat actuators 7 are final actuator parts, repeatedly beat the ridge soil downwards, level and lift the ridge soil at the two sides of the ridge, and beat the soil cyclically so as to vibrate the soil. Fluidity of the ridge soil of the ridge surface is improved, the ridge soil flows back to fill the hole advantageously, and the ridge shape at two side surfaces can be further reinforced.

Figure 5:
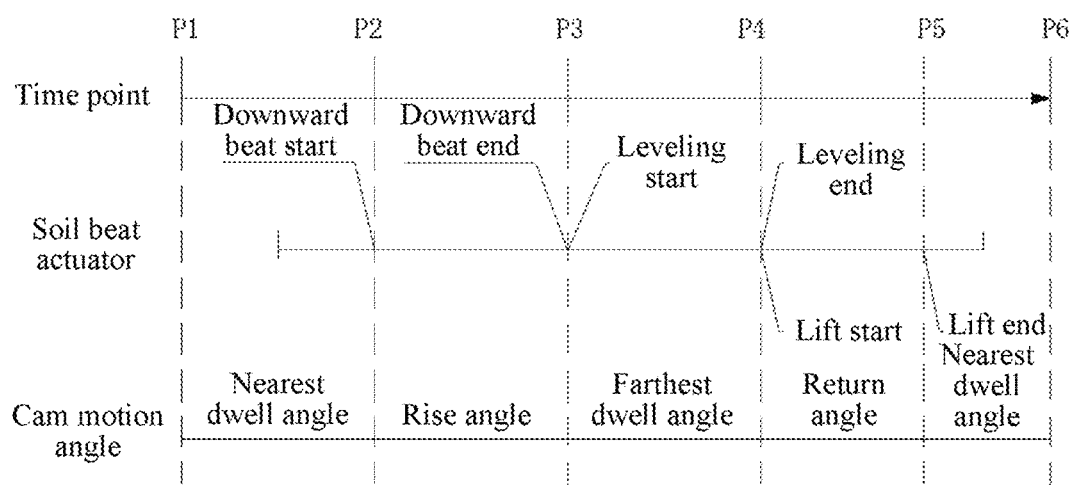
FIG. 5 is a time sequence diagram of a process of performing one soil beat cycle of downward beat, leveling, and lift of the vibratory backfilling device for on-ridge transplant according to the present disclosure.
Figure 6:
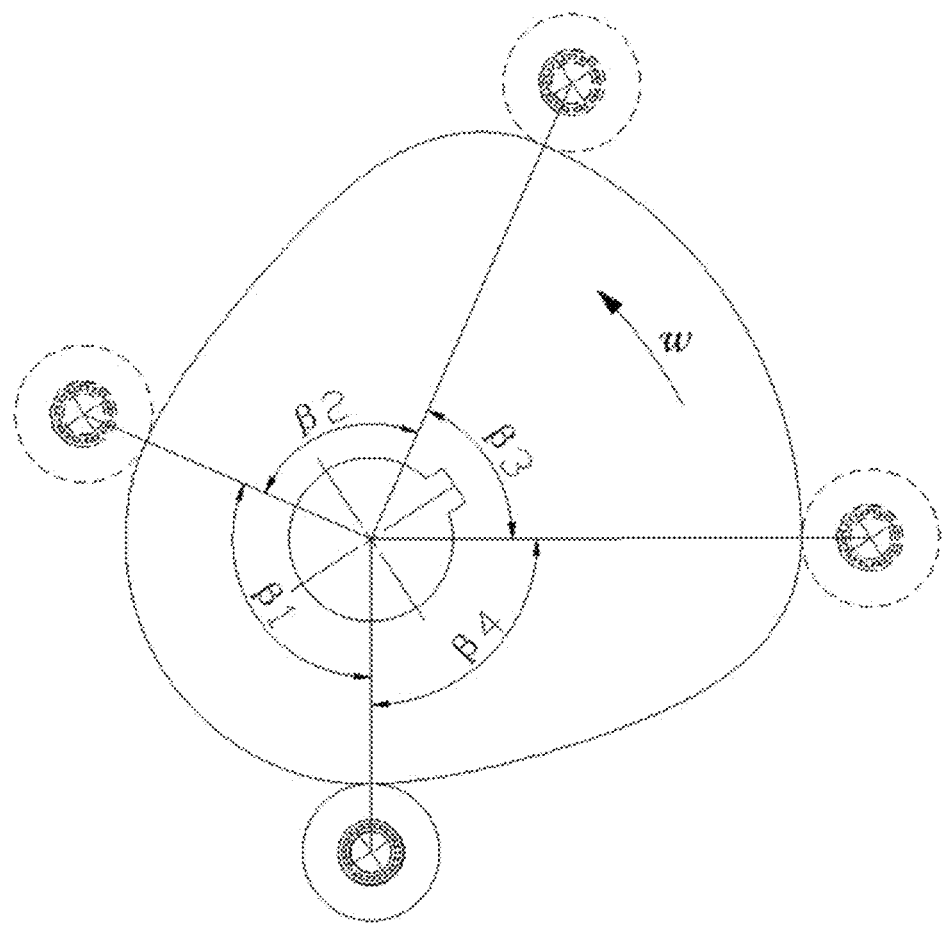
FIG. 6 is a schematic diagram of contact between a cam and a roller of the vibratory backfilling device for on-ridge transplant according to the present disclosure.
Figure 7:
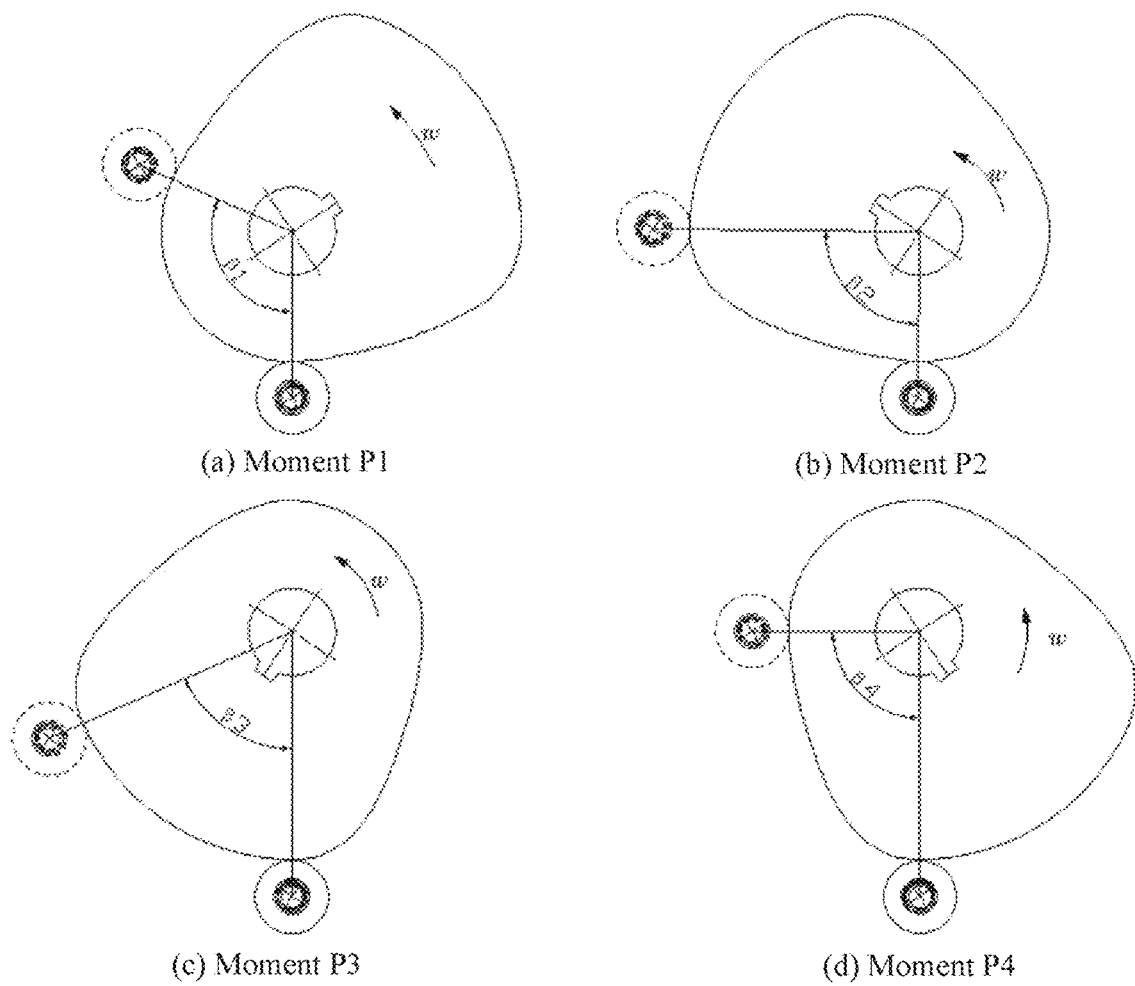
FIG. 7 is a diagram of work positions of a cam and a roller at four corresponding moments of the vibratory backfilling device for on-ridge transplant according to the present disclosure.

A specific implementation process is described by referring to FIG. 5 to FIG. 7.

FIG. 5 to FIG. 7 are a time sequence diagram of one cycle process of downward beat, leveling, and lift and a diagram of work positions of the cam and the roller at corresponding moments of the vibratory backfilling device of the present disclosure. At moments P1-P2, the soil beat actuator 7 is in an initial state, and the drive motor 10 drives the cam 3 to rotate at a rotation angle equal to a nearest dwell angle β1 of the cam 3. During this process, the roller 4, the slidable push rod 5, the link rod 6, and the soil beat actuator 7 maintain state positions at the moment P1 without change.

At moments P2-P3, the drive motor 10 continues driving the cam 3 to rotate at a rotation angle equal to a rise motion angle β2 of the cam 3, and the soil beat actuator 7 starts to perform a downward beat action. During this process, the roller 4 and the slidable push rod 5 slide downwards along the straight notch, and the link rod 6 drives the upper end of the soil beat actuator 7 to rotate downwards and beat and act on a position, close to the hole, of an upper portion of the ridge. The upper end of the soil beat actuator 7 beats the ridge soil to cause the ridge soil to flow back and backfill the ridge soil, the slidable push rod 5 slides downwards to a lowermost end at the moment P3, and a downward beat process is completed.

At the moment P3, the soil beat actuator 7 is in a state of downbeat action completion, and at moments P3-P4, an angle at which the drive motor 10 drives the cam 3 to rotate is equal to a farthest dwell angle β3 of the cam 3, and the soil beat actuator 7 starts leveling. During a leveling process, the roller 4, the slidable push rod 5, the link rod 6, and the soil beat actuator 7 maintain state positions at the moment P3 without change, and the soil beat actuator 7 tamps and protects the ridge structure.

At moments P4-P5, the drive motor 10 continues driving the cam 3 to rotate at a rotation angle equal to a return travel motion angle β4 of the cam 3, and the soil beat actuator 7 starts to perform a lift action. During this process, the roller 4 and the slidable push rod 5 slide upwards along the straight notch under the action of the preload spring, the link rod 6 drives the soil beat actuator 7 to swing, and the upper end of the soil beat actuator 7 is lifted up. At the moment P5, the soil beat actuator 7 returns to the initial state position, and one cyclic process of soil beat and compaction of the downward beat, leveling, and lift is completed.

The vibratory backfilling device of the present disclosure is configured to be used on the transplanter, in the process of the on-ridge transplant, the cam link mechanism is driven by the motor, and the soil beat actuator cyclically performs the cyclic soil beat action of the downward beat, leveling, and lift at a particular frequency. The two soil beat actuators are configured to collectively form a trumpet shape with a smaller top and a larger bottom matching the ridge shape on the section of the ridge, and the ridge soil beat action mainly acts on the upper portion, close to the hole of the pot seedling, of the ridge, such that backfilling is performed more advantageously. The soil beat frequency can be further increased or decreased by controlling a speed of the drive motor, so as to better match a planting frequency of the transplanter. By using a soil beat and vibration method at the two sides of the ridge, the ridge soil flows back, the damage to the pot seedling can be reduced, a soil layer is not excessively compacted, the pot seedling grows advantageously, and the ridge shape can be further reinforced.

The embodiments described above are merely the preferred embodiments of the present disclosure, and do not limit the present disclosure in any form. Although the present disclosure has been disclosed in the preferred embodiments, the preferred embodiments are not used to limit the present disclosure. Those skilled in the art can derive equivalent embodiments by make equivalents changes, for example, some alterations or modifications on the technical content disclosed above without departing from the scope of the technical solution of the present disclosure. However, any simple alteration, equivalent change and modification made on the embodiment described above based on the technical essence of the present disclosure without departing from the content of the technical solution of the present disclosure should fall within the scope of the technical solution of the present disclosure.

What is claimed is:

1. A vibratory backfilling device for on-ridge transplant, comprising: a mounting frame, vertical base plates, cam link mechanisms and a soil beat actuator, wherein the mounting frame serves as a machine frame of the entire vibratory backfilling device, is mounted on a rear cross beam of a transplanter, and follows the transplanter to move forwards between ridges; two sides of the mounting frame are connected to the vertical base plates respectively, the cam link mechanism is mounted on the vertical base plate, and the cam link mechanism comprises a cam, a roller, a slidable push rod, a preload spring, and a link rod; the cam is located at an uppermost end of the vertical base plate and is connected to an output shaft of a drive motor, a top of the slidable push rod is provided with the roller, and the roller is arranged to press against the cam; the slidable push rod is capable of moving up and down in the vertical base plate, a lower end of the slidable push rod is hinged to one end of the link rod, the other end of the link rod is hinged to the soil beat actuator, one end of the preload spring is fixedly connected to the vertical base plate, the other end of the preload spring is connected to the slidable push rod, and the preload spring is used for providing upward acting force for the slidable push rod to make the roller at a top end of the slidable push rod press against the cam constantly; and the soil beat actuator is a long plate, a middle of the long plate is rotatably arranged on the vertical base plate, an upper end of the long plate inclines towards an inner side of the vertical base plate and is hinged to a tail end of the link rod, and the soil beat actuator is driven by the cam link mechanism and continuously vibrates and beats two sides of the ridge where a pot seedling is just planted so as to cause ridge soil to flow back and backfill a hole of the pot seedling.

2. The vibratory backfilling device for on-ridge transplant according to claim 1, wherein a straight notch is provided in the vertical base plate, and a shaft for hinging the slidable push rod to the link rod is located in the straight notch.

3. The vibratory backfilling device for on-ridge transplant according to claim 1, wherein a length of the link rod is adjustable.

4. The vibratory backfilling device for on-ridge transplant according to claim 3, wherein the link rod is of nested design, and comprises a link rod sleeve and a link rod shaft, the link rod shaft is mounted in the link rod sleeve, a plurality of slots are provided in the link rod sleeve in a length direction, and the length of the link rod is adjusted by adjusting the link rod shaft to be correspondingly and fixedly connected to the slots at different positions in the link rod sleeve.

5. The vibratory backfilling device for on-ridge transplant according to claim 1, wherein the soil beat actuator is configured in a spade-like shape, a reinforcing rib is arranged in a middle of the soil beat actuator, and two side plates are bent towards the middle at an angle.

6. The vibratory backfilling device for on-ridge transplant according to claim 1, wherein the mounting frame is a rectangular frame and is fixed to the rear cross beam of the transplanter through bolts.

7. The vibratory backfilling device for on-ridge transplant according to claim 1, wherein the drive motor is fixed to an outer side of the vertical base plate.

* * * * *